(12) United States Patent
Lee

(10) Patent No.: US 7,368,901 B2
(45) Date of Patent: May 6, 2008

(54) SEQUENTIAL CONTROL CIRCUIT

(75) Inventor: Ing-Ming Lee, Taipei (TW)

(73) Assignee: Lite-On It Corporation, Taipei (TW)

( * ) Notice: Subject to any disclaimer, the term of this patent is extended or adjusted under 35 U.S.C. 154(b) by 218 days.

(21) Appl. No.: 11/235,343

(22) Filed: Sep. 27, 2005

(65) Prior Publication Data

US 2006/0107139 A1    May 18, 2006

(30) Foreign Application Priority Data

Oct. 8, 2004    (TW) .............................. 93130487 A

(51) Int. Cl.
*G01R 31/28*    (2006.01)
(52) U.S. Cl. .................... 324/73.1; 324/76.11
(58) Field of Classification Search ............... 324/73.1, 324/677, 678
See application file for complete search history.

(56) References Cited

U.S. PATENT DOCUMENTS

| | | | | |
|---|---|---|---|---|
| 4,105,928 A | * | 8/1978 | Leconte | 315/82 |
| 4,682,050 A | * | 7/1987 | Beranger et al. | 326/26 |
| 4,904,889 A | * | 2/1990 | Chieli | 327/432 |
| 5,929,618 A | * | 7/1999 | Boylan et al. | 323/282 |
| 6,404,220 B1 | * | 6/2002 | Hashimoto | 324/73.1 |
| 6,815,842 B2 | * | 11/2004 | Fehd et al. | 307/40 |

* cited by examiner

*Primary Examiner*—Vincent Q. Nguyen
(74) *Attorney, Agent, or Firm*—Bacon & Thomas, PLLC

(57) ABSTRACT

A sequential control circuit operates according to an input signal. When the input signal is determined at a first state, the sequential control circuit asserts a plurality of control signals in a predetermined sequence. When the input signal is determined at a second state, the sequential control circuit de-asserts the plurality of control signals in a sequence reverse to the predetermined sequence.

7 Claims, 4 Drawing Sheets

SEQUENTIAL CONTROL CIRCUIT

This application claims the benefit of Taiwan application Serial No. 93130487, filed Oct. 8, 2004, the subject matter of which is incorporated herein by reference.

BACKGROUND OF THE INVENTION

1. Field of the Invention

The invention relates in general to a sequential control circuit, and more particularly to a sequential control circuit, which asserts a plurality of control signals in a predetermined sequence and de-asserts the plurality of control signals in a sequence reverse to the predetermined sequence according to a state of an input signal.

2. Description of the Related Art

With the rapid development of the technology, the typical digital manipulation circuit can be easily designed and formed in the IC chip, and different IC chips have different special functions. Generally speaking, each IC chip has its specific operation mode or method. So, the IC chip manufacturers provide specifications to introduce the pins, the connections and the operations of the IC chips in order to avoid the damage or glitch of the IC chips due to the incorrect usage of the user.

Typically, the specifications of some specific IC chips, such as the LSI-8602 chip, specify the assertion sequence. The IC chip has to be turned on in a predetermined sequence to control the signals to be inputted to different pins, and to be turned off by de-asserting the inputs of the control signals in a sequence reverse to the predetermined sequence. For example, the IC chip can be normally turned on only when the high-level control signals are sequentially inputted to the pins A to D. The sequence cannot be changed or the IC chip may have glitch or error. Furthermore, the IC chip has to be turned off normally only when the low-level control signals are sequentially inputted to the pins D to A. The sequence cannot be changed or the IC chip may have glitch or error.

FIG. 1 is a schematic illustration showing an IC chip requiring the sequential assertion and the sequential de-assertion, and connection wires for the IC chip. In order to make the IC chip 6 operate normally and without error, the designer makes the IC chip 6 to be connected to a microprocessor (or micro controller) 4 and controls the firmware program to control the IC chip 6. As shown in FIG. 1, four input/output ports (I/O-1, I/O-2, I/O-3, I/O-4) of the microprocessor 4 are respectively connected to pins A to D of the IC chip 6. When the IC chip 6 wants to turn on, the firmware program enables the four input/output ports to output control signals 1000, 1100, 1110 and 1111 (1 represents the high level and 0 represents the low level) sequentially. Thus, the IC chip 6 can turn on normally according to the high-level control signals sequentially received by the pins A to D. On the contrary, when the IC chip 6 wants to turn off, the firmware program enables the four input/output ports to output the control signals of 1110, 1100, 1000 and 0000 sequentially. Thus, the IC chip 6 can turn off normally according to the low-level control signals sequentially received by the pins D to A.

However, because the number of pins of the input/output port of the microprocessor 4 is restricted, it is an important subject of the invention to assert the control signals in a predetermined sequence with a less number of input/output pins and low-cost circuit devices.

SUMMARY OF THE INVENTION

It is therefore an object of the invention to provide a sequential control circuit for receiving an input signal, asserting a plurality of control signals in a predetermined sequence when the input signal is determined at a first state, and de-asserting the plurality of control signals in a sequence reverse to the predetermined sequence when the input signal is determined at a second state.

The invention achieves the above-identified object by providing a sequential control circuit, which includes an input terminal, a first output terminal, a second output terminal, a first diode having an anode connected to the input terminal and a cathode connected to the first output terminal, a first resistor connected between the input terminal and the first output terminal, a first condenser coupled between the first output terminal and a ground, a second diode having a cathode connected to the input terminal and an anode connected to the second output terminal, a second resistor connected between a voltage source and the second output terminal, and a second condenser connected between the second output terminal and the ground.

The invention also achieves the above-identified object by providing a sequential control circuit, which includes a first condenser connected to a rapid charge path and a trickle discharge path, a second condenser connected to a trickle charge path and a rapid discharge path, and a manipulation circuit for controlling, according to a signal input operation at an input terminal, the first condenser to charge through the rapid charge path and the second condenser to charge through the trickle charge path when a signal at the input terminal is determined at a first state, and the first condenser to discharge through the trickle discharge path and the second condenser to discharge through the rapid discharge path when the signal at the input terminal is determined at a second state.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
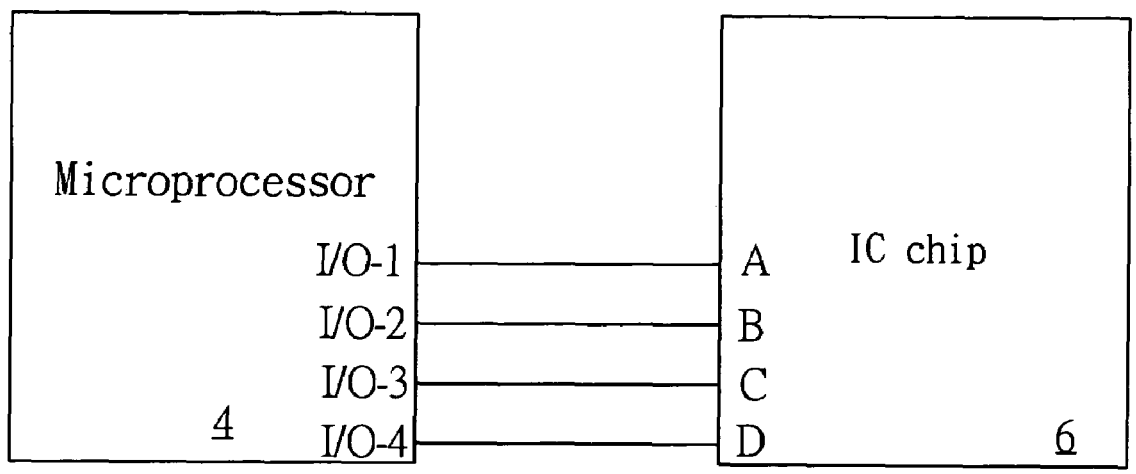
FIG. 1 is a schematic illustration showing an IC chip requiring the sequential assertion and the sequential de-assertion, and connection wires for the IC chip.
Figure 2:
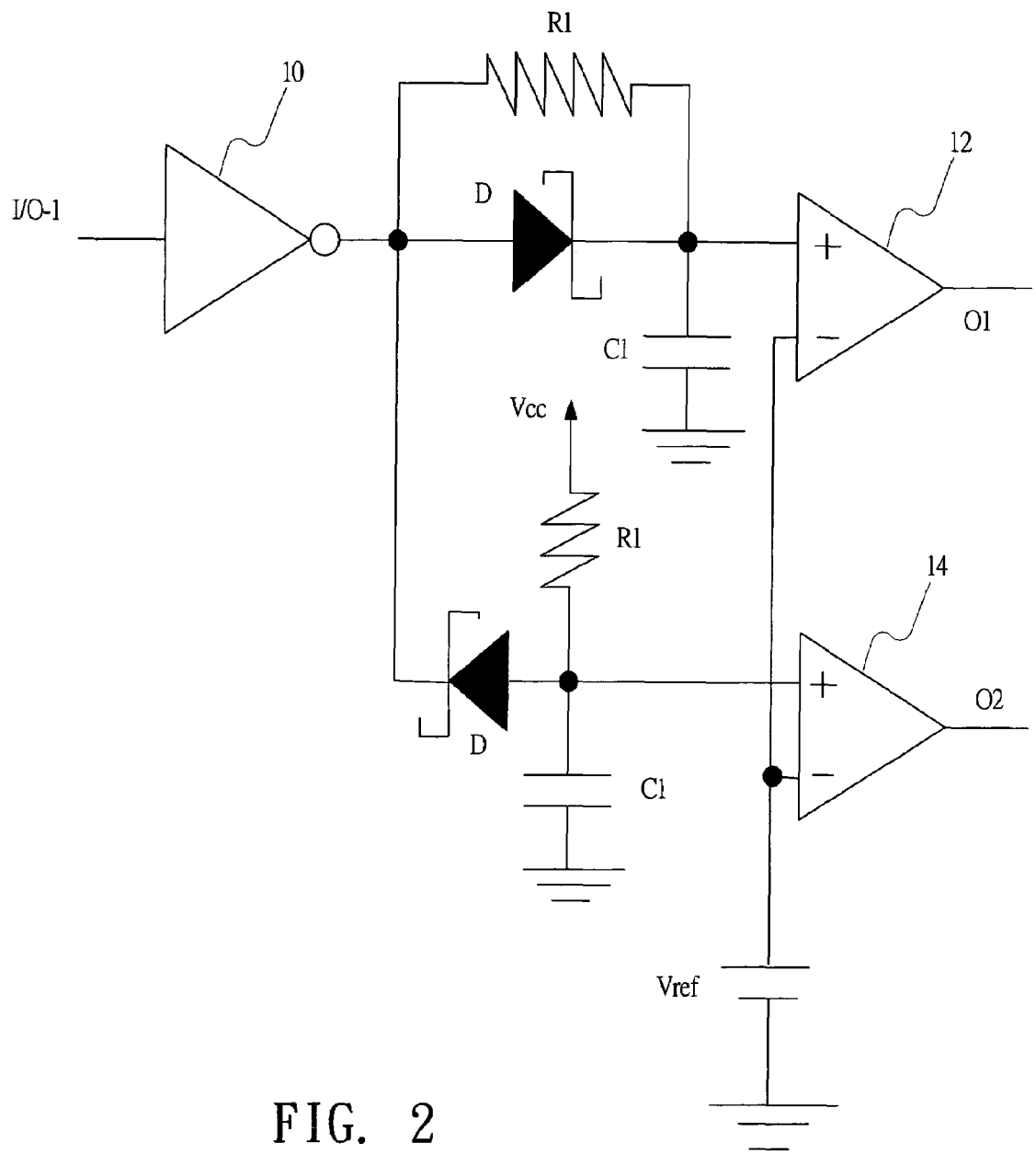
FIG. 2 is a schematic illustration showing a sequential control circuit of the invention.

FIG. 2 is a schematic illustration showing a sequential control circuit of the invention. As shown in FIG. 2, an input terminal of an inverter 10 is connected to an input/output port (I/O-1), and a resistor R1 is connected between an output terminal of the inverter 10 and a first node, which is a positive terminal of a first comparator 12. A Schottky diode D has an anode connected to the output terminal of the inverter 10 and a cathode connected to the first node. A condenser C1 is connected between the first node and a ground. A negative terminal of the first comparator 12 is connected to a reference voltage (Vref). Another resistor R1 is connected between a voltage source (Vcc) and a second node, which is a positive terminal of a second comparator 14. Another Schottky diode D has a cathode connected to the output terminal of the inverter 10 and an anode connected to the second node. Another condenser C1 is connected between the second node and the ground. The negative terminal of the second comparator 14 is connected to the reference voltage (Vref). Furthermore, the comparator of the invention may be replaced by an OP amplifier, and the phase inverter 10 of this embodiment of the invention is only used to enhance the fan out ability. Of course, one of ordinary skill in the art may also use a buffer and change the signal of the input/output port to achieve the object of asserting a plurality of control signals in a predetermined sequence or de-asserting the plurality of control signals in a sequence reverse to the predetermined sequence.

At the initial stage, assume that there is not any charge stored in the two condensers. The output terminal of the inverter 10 has a high voltage when the output of I/O-1 changes from the high voltage to the low voltage. At this time, the Schottky diode D connected to the first comparator 12 is in a state of forward bias (i.e., the diode D has a rapid charge current path), so the condenser C1 connected to the first comparator 12 is charged rapidly and reaches a voltage higher than the reference voltage (Vref) within an extremely short time period, such that the output terminal (O1) of the first comparator 12 rapidly outputs the high voltage. Because the Schottky diode D connected to the second comparator 14 is in a state of reverse bias, the condenser C1 connected to the resistor R1 and the second comparator 14 is charged at a speed of the time constant R1C1 (i.e., through a trickle charge current path). After a short period of charge time, the condenser of the second comparator 14 reaches a voltage higher than the reference voltage (Vref) such that the output terminal (O2) of the second comparator 14 outputs the high voltage. That is, when the output of the input/output port (I/O-1) changes from the high voltage to the low voltage, the output terminal (O1) of the first comparator 12 outputs the high voltage earlier, and the output terminal (O2) of the second comparator 14 outputs the high voltage later.

When the output of I/O-1 changes from the low voltage to the high voltage, the output terminal of the inverter 10 has the low voltage. At this time, the Schottky diode D connected to the second comparator 14 is in the state of forward bias (i.e., has a rapid discharge current path), so the condenser C1 of the second comparator 14 rapidly discharges and reaches a voltage lower than the reference voltage (Vref) within an extremely short time period, such that the output terminal (O2) of the second comparator 14 outputs the low voltage rapidly. Because the Schottky diode D connected to the first comparator 12 is in the state of reverse bias, the condenser C1 connected to the resistor R1 and the first comparator 12 discharges at the speed of the time constant R1C1 (i.e., through the trickle discharge current path). After a short period of discharge time, the condenser C1 connected to the first comparator 12 reaches a voltage lower than the reference voltage (Vref), such that the output terminal (O1) of the first comparator 12 outputs the low voltage. That is, when the output of the input/output port (I/O-1) changes from the low voltage to the high voltage, the output terminal (O1) of the first comparator 12 outputs the low voltage later, and the output terminal (O2) of the second comparator 14 outputs the high voltage earlier.

As shown in the sequential control circuit of FIG. 2, when the voltage of the input/output port changes from the high voltage to the low voltage, the output terminal of the first comparator operates (outputs the high voltage) earlier and the output terminal of the second comparator operates later. On the contrary, when the voltage of the input/output port changes from the low voltage to the high voltage, the output terminal of the second comparator operates (outputs the low voltage) earlier and the output terminal of the first comparator operates later.

Figure 3:
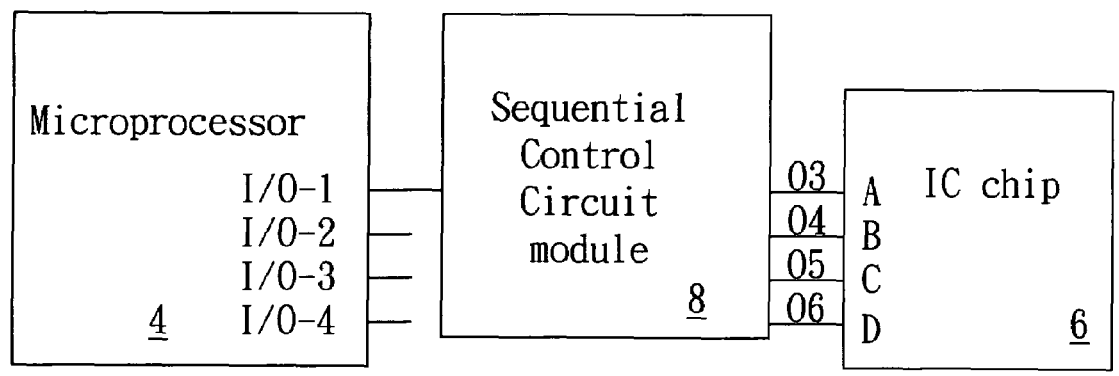
FIG. 3 is a schematic illustration showing the sequential control circuit of the invention for controlling an IC chip requiring the sequential assertion and the sequential de-assertion, and connection wires for the IC chip.

FIG. 3 is a schematic illustration showing the sequential control circuit of the invention for controlling an IC chip requiring the sequential assertion and the sequential de-assertion, and connection wires for the IC chip. In order to make the IC chip 6 operate normally and without error, a microprocessor 4 and its firmware program are used to control one input/output port (I/O-1). As shown in FIG. 3, the input/output port (I/O-1) of the microprocessor 4 is connected to a sequential control circuit module 8, which has four output terminals (O3, O4, O5, O6) respectively connected to pins (A, B, C, D) of the IC chip 6. When the IC chip 6 wants to turn on, the firmware program is used to convert the voltage of the input/output port (I/O-1) from the high level to the low level. Thus, the pins A to D can sequentially receive the high-level control signals such that the IC chip 6 can turn on normally. On the contrary, when the IC chip 6 wants to turn off, the firmware program is used to convert the voltage of the input/output port (I/O-1) from the low level to the high level. Thus, the pins D to A can sequentially receive the low-level control signal to turn off the IC chip 6 normally.

Figure 4:
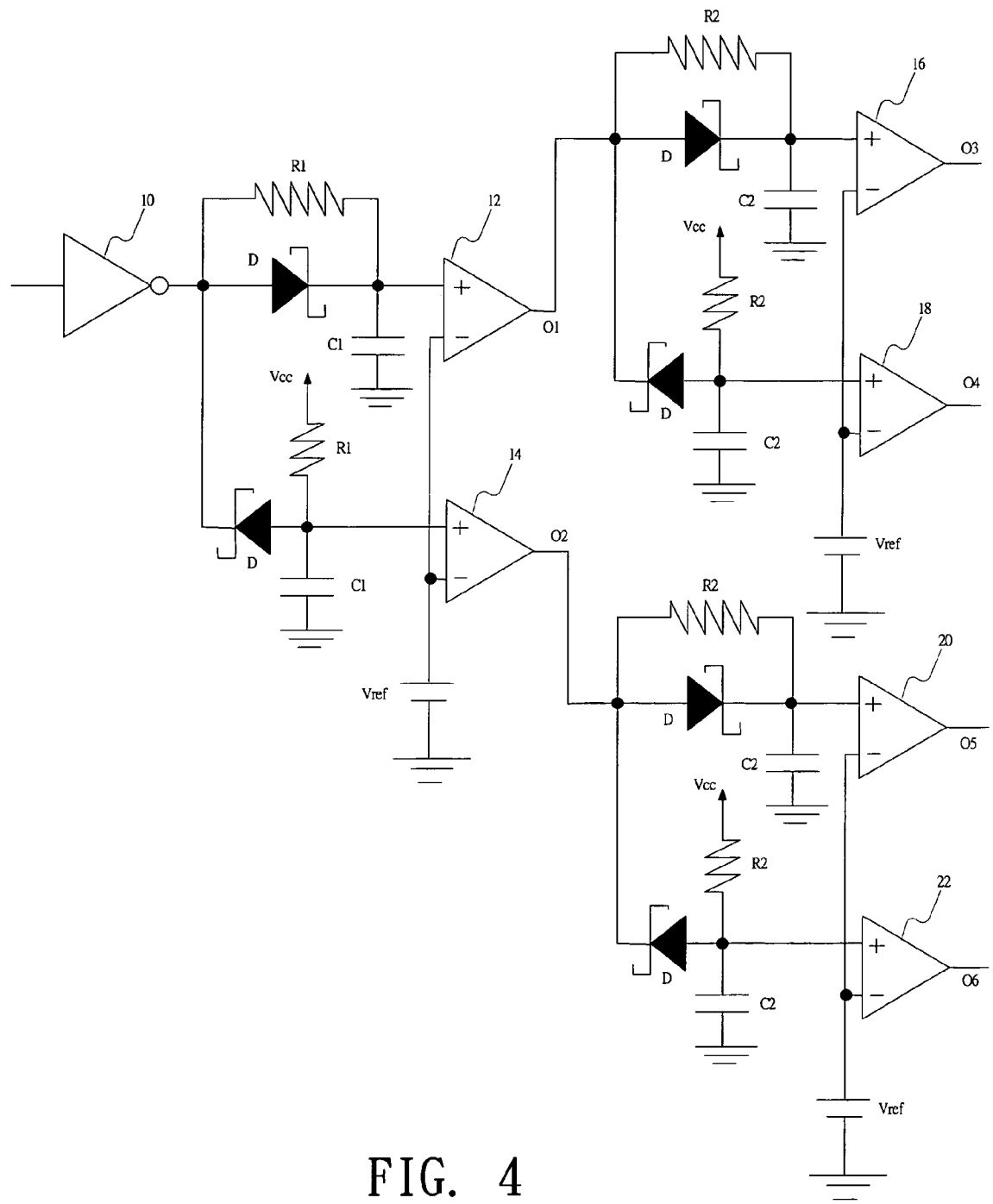
FIG. 4 shows a sequential control circuit module of the invention.

FIG. 4 shows a sequential control circuit module of the invention. The sequential control circuit module includes three sequential control circuits. That is, the output terminals (O1, O2) of the sequential control circuit of FIG. 2 may be respectively connected to a sequential control circuit such that the sequential control circuit module can assert four output terminals (O3, O4, O5, O6). Thus, the sequential control circuit module can assert the outputs in a predetermined sequence according to the different time constants of R1C1 and R2C2. That is, when the output of I/O-1 changes from the high voltage to the low voltage, the output terminal (O3) of a third comparator 16 outputs the high voltage firstly, the output terminal (O4) of a fourth comparator 18 outputs the high voltage secondly, the output terminal (O5) of a fifth comparator 20 outputs the high voltage thirdly, and the output terminal (O6) of a sixth comparator 22 outputs the high voltage at last.

When the output of I/O-1 changes from the low voltage to the high voltage, the output terminal (O6) of the sixth comparator 22 outputs the low voltage firstly, the output terminal (O5) of the fifth comparator 20 outputs the low voltage secondly, the output terminal (O4) of the fourth comparator 18 outputs the low voltage thirdly, and the output terminal (O3) of the third comparator 16 outputs the low voltage at last.

Furthermore, the sequential control circuit of the invention does not intend to limit the control voltage of the output terminal and the voltage of the output terminal of the sequential control circuit. That is, one of ordinary skill in the art may modify the sequential control circuit into sequential control circuits having the predetermined sequence but different input voltages or output voltages. That is, the sequential control circuit of the invention can operate according to a manipulation signal (input/output port signal). When the manipulation signal is determined at a first state, the sequential control circuit asserts a plurality of control signals in a predetermined sequence. When the manipulation signal is determined at a second state, the sequential control circuit de-asserts the plurality of control signals in a sequence reverse to the predetermined sequence.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sequential control circuit, comprising:
   an input terminal;
   a first node;
   a second node;
   a first diode having an anode connected to the input terminal and a cathode connected to the first node;
   a first resistor connected between the input terminal and the first node;
   a first condenser coupled between the first node and a ground;
   a second diode having a cathode connected to the input terminal and an anode connected to the second node;
   a second resistor connected between a voltage source and the second node; and
   a second condenser connected between the second node and the ground, wherein:
   a speed of charging the first condenser is higher than a speed of charging the second condenser when a voltage of the input terminal is determined at a first state; and
   a speed of discharging the first condenser is lower than a speed of discharging the second condenser when the voltage of the input terminal is determined at a second state.

2. The sequential control circuit according to claim 1, wherein each of the first diode and the second diode is a Schottky diode.

3. The sequential control circuit according to claim 1, further comprising a reference voltage source for outputting a reference voltage, wherein a first control signal is outputted when a voltage of the first node is higher than the reference voltage, and a second control signal is outputted when the voltage of the second node is higher than the reference voltage.

4. A sequential control circuit, comprising:
   a first condenser connected to a rapid charge path and a trickle discharge path;
   a second condenser connected to a trickle charge path and a rapid discharge path; and
   a manipulation circuit for controlling, according to a signal input operation at an input terminal, the first condenser to charge through the rapid charge path and the second condenser to charge through the trickle charge path when a signal at the input terminal is determined at a first state, and the first condenser to discharge through the trickle discharge path and the second condenser to discharge through the rapid discharge path when the signal at the input terminal is determined at a second state.

5. The sequential control circuit according to claim 4, wherein the manipulation circuit comprises:
   a first diode having an anode connected to the input terminal and a cathode connected to one end of the first condenser, and the other end of the first condenser being connected to a ground;
   a first resistor connected in parallel with the first diode;
   a second diode having a cathode connected to the input terminal and an anode connected to one end of the second condenser, the other end of the second condenser being connected to the ground; and
   a second resistor connected to a voltage source and the anode of the second diode.

6. The sequential control circuit according to claim 5, wherein each of the first diode and the second diode is a Schottky diode.

7. The sequential control circuit according to claim 4, wherein the manipulation circuit further comprises a reference voltage source for outputting a reference voltage, outputting a first control signal when a voltage of the first condenser is higher than the reference voltage, and outputting a second control signal when the voltage of the second condenser is higher than the reference voltage.

* * * * *